United States Patent [19]

Barrot et al.

[11] 4,179,076

[45] Dec. 18, 1979

[54] SEALING DEVICE BETWEEN THE MOVABLE CRUSHING MEMBER AND THE BODY OF A GIRATORY CRUSHER

[75] Inventors: Jean C. Barrot, Neuilly-sur-Seine; Philippe Pulido, Aubervilliers, both of France

[73] Assignee: Babbitless, Paris, France

[21] Appl. No.: 927,605

[22] Filed: Jul. 24, 1978

[30] Foreign Application Priority Data

Jul. 27, 1977 [FR] France .................................. 77 23143

[51] Int. Cl.² .................................................. B02C 2/04
[52] U.S. Cl. ........................................ 241/216; 241/207
[58] Field of Search ................ 241/207, 208, 209, 210, 241/211, 212, 213, 214, 215, 216

[56] References Cited

U.S. PATENT DOCUMENTS

| 525,443 | 9/1894 | Carman et al. ............... 241/216 X |
| 2,054,326 | 9/1936 | Jacobson ....................... 241/216 X |
| 2,832,547 | 4/1958 | Kennedy ....................... 241/216 X |

FOREIGN PATENT DOCUMENTS 286476  1/1971  U.S.S.R. .................................. 241/207

*Primary Examiner*—Richard B. Lazarus
*Attorney, Agent, or Firm*—Owen, Wickersham & Erickson

[57] ABSTRACT

A gyratory crusher has a sealing device between a shaft and a body, the device comprising an annular chamber carried by the body, and containing liquid, and a rigid wall carried by the shaft and projecting downwards into the liquid, and extended downwards by a flexible skirt.

9 Claims, 2 Drawing Figures

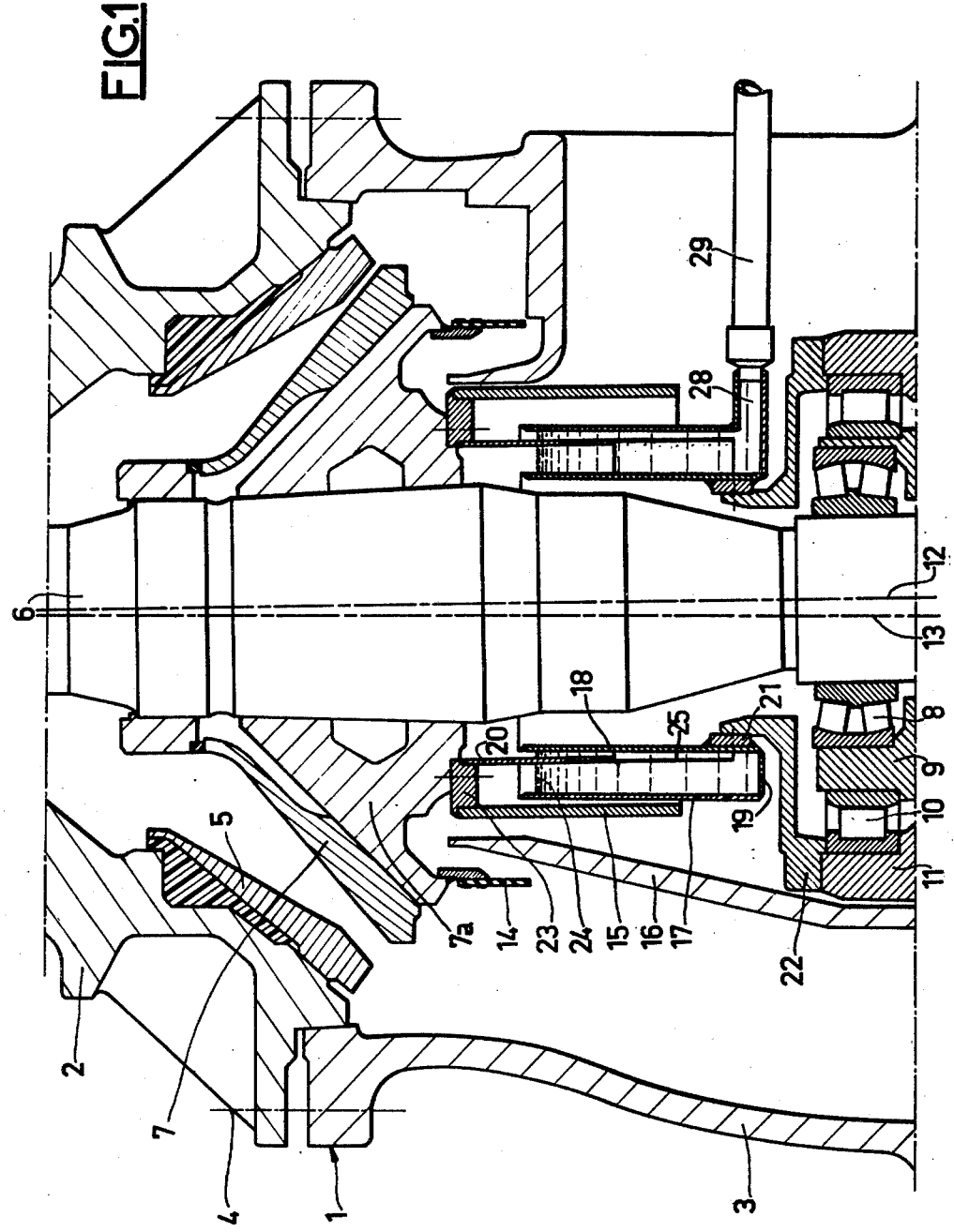

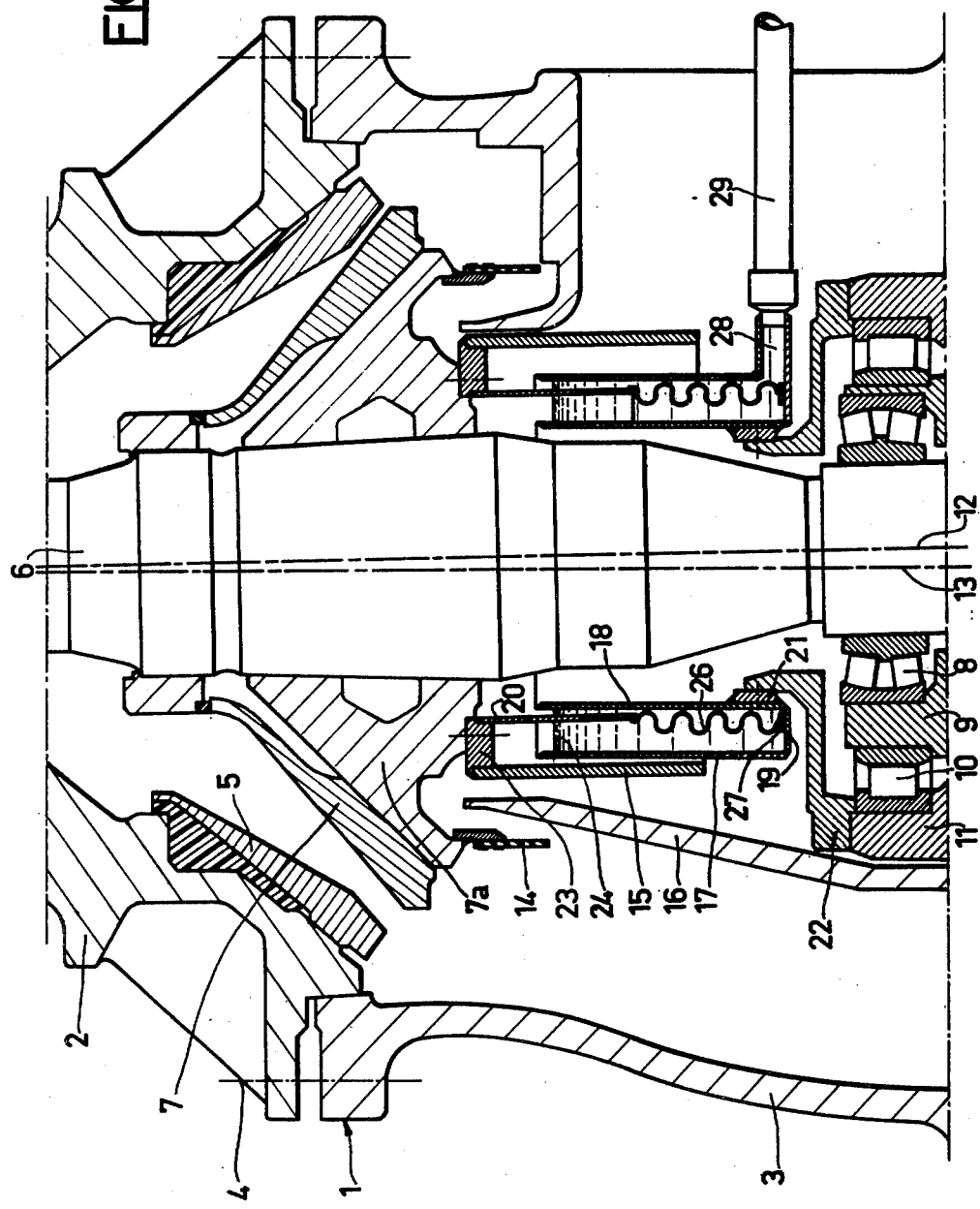

SEALING DEVICE BETWEEN THE MOVABLE CRUSHING MEMBER AND THE BODY OF A GIRATORY CRUSHER

The present invention relates to a sealing device between the shaft line supporting the movable crushing member and the body of a gyratory crusher, the said shaft line being able to be actuated with a pendulum movement so as to describe a cone with a vertical axis, a rotary movement about its own axis, and a translatory movement along this axis, this last movement permitting the movable crushing member to modify its position relative to the body.

In the gyratory crusher, the crushing of materials takes place between a fixed external circular member, hereinafter called "crushing ring", and an internal movable circular member, hereinafter called "crushing core". The crushing ring is fixed to the body of the crusher. The crushing core is fixed to the shaft line, so as to perform a pendulum movement relative to the crushing ring. For this purpose, the shaft line is suspended in such a way as to be able to turn on itself at a point situated above the crushing ring and on the axis of revolution of the latter, while the lower extremity of the shaft line is mounted to rotate in an eccentric, itself mounted to rotate in the body of the crusher on the axis of revolution of the crushing ring. The pendulum movement of the shaft line is obtained from the fact that the eccentric is caused to rotate.

The materials introduced into the crusher are crushed between the ring and the core by the continuous motion of separation and approach of each point of the external circumference of the core relative to the internal circumference of the crushing ring.

Moreover, when the crusher is operating empty, the core, secured to the shaft line, is moved, like the latter, with a slow rotary movement around its axis, principally under the effect of friction between the foot of the shaft line and the components of driving mechanism for the driving of the shaft line.

Finally, the core and the shaft line which support it can be actuated with a translatory axial movement modifying the position of the core relative to the crushing ring. This movement can occur for three reasons:

on the one hand, to regulate the grain size of the materials being crushed.

on the other hand, to take up wear of the ring and of the core finally, so as to avoid any damage in the case of introduction of uncrushable bodies, or of congestion in the crusher. On this point, a safety device is provided which, when the substantially vertical force exerted on the shaft line via the crushing core exceeds a predetermined value, permits a rapid descent of this shaft line thus enlarging the section for passage between the ring and the core and permitting the discharge of uncrushable bodies or the elimination of the phenomenon of congestion.

To summarise, in a crusher of this kind, the core can thus be actuated relatively to the ring, that is to say relatively to the body, with a pendulum movement, a rotary movement, and an axial translatory movement, and these three movements can be superimposed.

A problem which is posed for such gyratory crushers is that of the sealing between the core or the shaft line supporting this core and the part of the body containing the driving mechanism for the shaft line (eccentric, bearings).

Various solutions have been put forward to attempt to resolve this problem and are used at the present time.

One of these solutions consists in achieving sealing between the shaft line carrying the core and the body by a flexible bellows of rubber or plastics material fixed rigidly to the body and connected to the shaft line in a manner which permits rotation of the latter, which implies the presence at this point of a sealing system between two components which are rotatable relatively to one another, the two other movements being absorbed by the bellows.

The sealing system between the two relatively rotatable components is, preferably, of the type with lubrication by grease of low stiffness under pressure, so as to avoid any torsional action on the bellows.

This device with a bellows ensures a very good sealing, but its trustworthiness leaves something to be desired, bearing in mind the vulnerability of the material constituting the bellows, which can be subjected to mechanical attack by the crushed materials, for example in the case of accidental congestion of the apparatus or when, as a result of defective maintenance, fine crushed materials accumulate and agglomerate around the bellows. Moreover, any defect of lubrication of this sealing system between the bellows and the shaft line gives rise to a risk of twisting of the bellows which endangers the good condition of the latter.

Another device proposed to solve this problem of sealing is based on the use of axial baffles forming a labyrinth. This device, which is rarely used, does not have any vulnerability at the mechanical level, but provides doubtful sealing, bearing in mind the large quantity of dust in suspension in the atmosphere around the zone to be protected.

The present invention has as its subject a perfectly trustworthy device ensuring an absolute sealing between the shaft line supporting the crushing core and the body of a gyratory crusher, which shaft line can be actuated with a pendulum movement, a rotary movement around itself, and an axial translatory movement relative to the body, as described above.

The sealing device according to the invention comprises an annular chamber having the same vertical axis as the crushing ring, and surrounding the space swept out by the shaft line. This annular chamber, carried by the body, is open upwards and contains a liquid. The movable shaft line carries a rigid substantially cylindrical wall, having the same axis as itself, and extending downwards into the liquid in the chamber.

The width of the annular chamber is greater than the maximum amplitude of pendulum movement of the shaft line at the level of this chamber.

This arrangement is necessary so that, in the position of maximum introduction in which its lower edge lies at a small distance above the bottom of the chamber, the cylindrical wall carried by the shaft line and projecting into the liquid in the chamber does not throw the said liquid out of this chamber even when the shaft line is actuated with a pendulum movement of maximum speed and amplitude.

The risk of seeing the liquid projected out of the annular chamber is, for a pendulum movement of given amplitude and speed, progressively smaller, as the width of the chamber is larger. However, in the case of gyratory crushers, the space available for introduction of the sealing device is often very restricted.

If, furthermore, the axial movement which the core must be able to perform relative to the body is very large, it can be advantageous to reduce the height of the cylindrical wall carried by the shaft line, and to prolong this wall downwards, around all its periphery, by a flexible skirt.

Such a wall, composed of a portion of rigid wall prolonged by a flexible skirt, displaces the liquid to a less extent than a rigid wall of the same height, which thus enables one to reduce the width of the annular chamber.

This flexible skirt can be for example of cylindrical shape.

Furthermore, it is possible to make this flexible skirt in such a way that it is of variable height, for example by giving it the shape of a bellows and preferably giving it at its lower part a sliding ring permitting it to make contact, without inconvenience, with the bottom of the chamber. It is thus possible to reduce the height of this chamber.

It is important for the good functioning of the sealing device that the latter also comprises means to avoid the penetration of dust in substantial quantities into the liquid in the annular chamber. Preferably, these means are constituted by a supplementary rigid wall, substantially cylindrical, carried by the movable shaft line, in a manner concentric with and outside the wall extending into the liquid in the chamber, and sufficiently spaced from that wall to be able to completely enclose the above-mentioned annular chamber without contact, when the apparatus is assembled. This supplementary wall has not only the function of forming a baffle with the external wall of the annular chamber, so as to constitute an effective preliminary barrier to the rising of dust into the annular chamber, but also to protect the entire device, which implies that it should be of a sufficient thickness and be mounted with all necessary rigidity.

To eliminate dust which may, nevertheless, penetrate into the liquid in the annular chamber and remain in it in suspension, the annular chamber may advantageously be connected to a filter circuit.

Moreover it is possible to connect the annular chamber to an automatic circuit for maintenance of the level of the liquid in this chamber.

Two non-limiting examples of embodiment of the subject of the invention will be described below in more detail with reference to the accompanying drawings, being illustrated by FIGS. 1 and 2 which show axial sections of a part of a gyratory crusher with two forms of embodiment of a sealing device according to the invention.

The gyratory crusher shown in FIG. 1 comprises an outer body 1 constituted by an upper part 2 and a lower part 3 rigidly secured together, for example by means of a conical joint held together by a series of bolts, of which only the centre lines 4 are shown. The upper part comprises internally a crushing ring 5 of conical shape.

Within the body 1 there is mounted a shaft line constituted by a substantially vertical shaft 6 and a rotary support 7a. A crushing core 7, likewise of conical shape intended to cooperate with the crushing ring 5, is mounted on the support 7a. The shaft 6 is suspended in the upper part of the body 2, above the ring 5, by a system of guiding bearings not shown. At the bottom, the shaft 6 is mounted by a ball and socket joint with two series of spherical rollers 8 in an eccentric 9, itself mounted by a bearing with cylindrical rollers 10 in a support 11 fixed to the body 1.

It will be seen that, as a consequence of the presence of the eccentric 9, the axis 12 of the shaft 6 does not coincide with the vertical axis 13 which constitutes the axis of symmetry of the support 11.

When the eccentric 9 is driven to rotate, by a drive not shown, the shaft 6 thus performs a pendulum movement around the axis 13, so that each point on the periphery of the core 7 approaches and separates from the periphery of the ring 5 at each rotation of pendulum movement, which produces the crushing of materials introduced between the ring 5 and the core 7.

In addition to this pendulum movement, the core 7 can perform, relatively to the ring 5, a rotary movement and an axial translatory movement, for the reasons already mentioned.

The mechanism comprising primarily the bearings 8, 10 and the eccentric 9, which mechanism is located below the core 7, must be protected against the dust arising from the crushing of materials between the core 7 and the ring 5. For this purpose, the support 7a of the core 7 carries an annular external deflector 14, as well as an annular internal deflector 15, both projecting downwards. Between these two deflectors 14, 15, which are separated by a gap of width greater than the amplitude of the pendulum movement of the shaft 6 at this level, there penetrates, from the bottom, a fixed annular deflector 16 secured for example to the lower part 3 of the outer body. The three deflectors 14, 15, 16 constitute a labyrinth opposing the entry of products of crushing between the deflectors 15 and 16.

This labyrinth is followed, in the direction of the mechanism 8, 9, 10, by a device the purpose of which is to ensure a perfect sealing. This device comprises an annular chamber open upwards, surrounding the shaft 6 at a distance and defined by two cylindrical vertical concentric rigid walls 17, 18 and by a bottom 19, as well as a cylindrical rigid wall 20 extending from above between the two walls 17, 18. The two walls 17, 18 and the bottom 19 are carried by a ring 21 fixed to a cover 22 mounted on the support 11. The wall 20 is fixed to the support 7a of the core 7, for example as shown via a ring 23 which also carries the deflector 15.

The chamber defined by the two walls 17, 18 and the bottom 19 is filled with a more or less viscous liquid, preferably with oil, the level of which is indicated at 24. The height of this chamber is defined by the height of the walls 17, 18, and its width corresponds to the difference between the radii of these two walls.

It will be seen further in FIG. 1 that the rigid wall 20 only extends into the liquid in the chamber to about the mid-height of the latter and is extended downwards by a cylindrical flexible skirt 25, for example of very resistant fabric, of rubber or of plastics material. Here it is a matter of an advantageous embodiment in the case where, for lack of space, the annular chamber cannot have a sufficient width, as has been described in more detail above. On the other hand, if the space available is sufficient, the rigid wall 20 can extend downwards to a short distance above the bottom 19 of the chamber, the core 7 being at its lowest position.

The height of the walls 17, 18, the height of the wall 20, the width of the annular chamber defined by the walls 17, 18 and the bottom 19, as well as the level 24 of the liquid contained in this chamber, must be chosen as a function of the individual characteristics of the crusher, that is to say the amplitude of pendulum movement of the core 7, the speed of rotation of the eccentric 9 and the amplitude of axial movement which can be performed by the core 7 (both for the purpose of regulating the grain size of the crushed products and of taking up wear of the ring 5 and of the core 7, and for a rapid lowering of the core 7 in the presence of uncrushable bodies).

Thus, with a rigid wall 20 without a flexible skirt 25, the height of the liquid contained in the chamber must be greater than the maximum axial displacement of the core 7, so that in all the axial positions of the core 7, the wall 20 remains immersed in the liquid.

The width of the chamber must be greater than the amplitude of pendulum movement of the wall 20 to such an extent that, when the wall 20 is introduced to a maximum into the liquid, and when the eccentric 9 turns at its maximum speed of rotation, no liquid is projected out of the chamber during the approaching movement of the wall 20 to the wall 17 or 18. It will be seen that this risk of projection of liquid out of the chamber is progressively smaller as the width of the chamber is larger, in that, in this case, the ratio of the quantity of liquid displaced to the quantity of liquid lying between the wall 20 and the walls 17 or 18 before the approach of the two walls is less.

The viscosity of the liquid contained in the chamber is also relevant on this point.

In the case of use of a flexible skirt 25 extending the rigid wall 20, the risk of projection of liquid out of the chamber reduces from the fact that such a skirt, thanks to its flexibility, displaces the liquid less than an entirely rigid wall. It is thus possible in this case to reduce the width of the chamber.

To remove impurities from the liquid which the latter inevitably picks up in the course of operation, it can be advantageous, in order to avoid having to clean the sealing device, to connect the chamber containing the liquid, by outlet piping 28, 29, to an external circuit for filtering of the liquid.

Moreover, it can be advantageous to connect the chamber in the same way to a circuit for automatic regulation of the level of liquid in this chamber.

In an extension of the piping 29, there is a drain opening, as well as a connection to a vertical piping provided with a filling opening in its upper part. The level of this opening is chosen so as to permit optimum filling and without overflowing of the annular chamber. A visual device for checking the level may also be provided in this locality.

The embodiment in FIG. 2, in which identical components have the same references, is distinguished from that in FIG. 1, solely by the fact that the flexible skirt extending the rigid wall downwards is here constituted by a skirt 26 in the form of a bellows, which enables it to shorten without force. At its lower end the skirt 26 includes a ring 27 of light weight, made for example of plastics material, and able to enter into sliding contact with the bottom 19 of the annular chamber. This enables one to reduce the height of the chamber as well as the height of the liquid contained in that latter, for a given maximum amplitude of axial movement of the core.

Furthermore, from the fact that the quantity of liquid displaced is thus reduced, it is possible at the same time to reduce the width of the annular chamber.

It goes without saying that numerous modifications and variations may be made in the sealing device as described above and shown in the accompanying drawing. Thus, the chamber containing the liquid and the wall 20 extending into this liquid may be differently fixed, provided that they cooperate to ensure the seal between the movable crushing member or its support and the body.

It will be seen that the invention thus permits one to effectively protect the driving mechanism of the shaft line. Although the description above relied on roller bearings it is entirely clear that the invention could likewise be applied without modification to any other type of bearing, and in particular to bearings with smooth contact where the problems of protection present themselves in a particularly acute manner.

We claim:

1. In a gyratory crusher comprising a shaft line supporting a movable crushing member within a body of the gyratory crusher, the said shaft line being able to be actuated with a pendulum movement, a rotary movement, and an axial translatory movement relative to the body; a sealing device comprising an annular chamber carried by the body, surrounding the volume swept out by the shaft line in the course of its pendulum movement, open upwards and containing a liquid, and a substantially cylindrical rigid wall carried by the movable shaft line, and projecting downwards into the liquid in the chamber, the width of this chamber being greater than the amplitude of the pendulum movement of the shaft line at the level of the said wall, with the improvement that the said rigid wall is extended downwards, around all its periphery, by a flexible skirt.

2. A device according to claim 1, wherein the said skirt is cylindrical.

3. A device according to claim 1, wherein the said skirt is in the form of a bellows of variable length.

4. A device according to claim 1, wherein the height of the liquid in the chamber is greater than the maximum amplitude of translatory axial movement of the shaft line supporting the movable crushing member.

5. A device according to claim 3, wherein the said flexible skirt has at its lower part a ring of small mass which can enter into sliding contact with the bottom of the annular chamber.

6. A device according to claim 1, including means for avoiding penetration of dust into the liquid contained in the annular chamber.

7. A device according to claim 6, wherein the said means are constituted by a supplementary rigid wall, substantially cylindrical, carried by the movable shaft line, in a manner concentric and external to the wall extending into the liquid in the annular chamber and sufficiently spaced from it to be able to enclose the said chamber completely and without contact while protecting it and while constituting a baffle with the external wall of that chamber.

8. A device according to claim 1, wherein the annular chamber is connected to an automatic circuit for regulation of the level of the liquid in the chamber.

9. A device according to claim 1, wherein the annular chamber is connected to an external circuit for filtration of the liquid.

* * * * *